(12) United States Patent
Yamakawa et al.

(10) Patent No.: US 8,783,227 B2
(45) Date of Patent: Jul. 22, 2014

(54) ENGINE CONTROL METHOD AND APPARATUS

(75) Inventors: Masahisa Yamakawa, Hiroshima (JP); Kouhei Iwai, Hiroshima (JP); Shuji Oba, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 694 days.

(21) Appl. No.: 13/012,406

(22) Filed: Jan. 24, 2011

(65) Prior Publication Data

US 2011/0180038 A1 Jul. 28, 2011

(30) Foreign Application Priority Data

Jan. 27, 2010 (JP) .................................. 2010-014907

(51) Int. Cl.
*F02B 3/06* (2006.01)
*F02B 3/08* (2006.01)
*F02D 35/02* (2006.01)

(52) U.S. Cl.
CPC ... F02B 3/06 (2013.01); F02B 3/08 (2013.01); F02D 35/023 (2013.01); F02D 35/026 (2013.01)
USPC ............................................. 123/435; 60/600

(58) Field of Classification Search
CPC .................................... F02B 3/06; F02B 3/08
USPC ......................... 123/254, 435, 436, 681, 682, 123/559.1–565, 605.1, 295, 299, 305, 472; 701/103–105, 110, 111; 60/600–603, 60/605.1
See application file for complete search history.

(56) References Cited

U.S. PATENT DOCUMENTS 6,739,295 B1 5/2004 Yamaoka et al.
8,459,021 B2 * 6/2013 Yamakawa et al. ............. 60/601
(Continued)

FOREIGN PATENT DOCUMENTS

JP 2001-289092 A 10/2001
JP 2002-155780 A 5/2002
(Continued)

OTHER PUBLICATIONS

An Office Action "Notice of Reasons for Rejection" issued by the Japanese Patent Office on Jul. 23, 2013, in JP 2010-014907, which corresponds to U.S. Appl. No. 13/012,406.

*Primary Examiner* — Hieu T Vo
*Assistant Examiner* — Sherman Manley
(74) *Attorney, Agent, or Firm* — Studebaker & Brackett PC

(57) ABSTRACT

An engine is designed to allow a compression self-ignition combustion under an air-fuel ratio leaner than a stoichiometric air-fuel ratio to be performed at least in a partial-load range of the engine. Under a condition that an engine speed varies at a same load in an engine operating region of the compression self-ignition combustion, a compression end temperature Tx, which is an in-cylinder temperature just before an air-fuel mixture self-ignites, is controlled to be raised higher in a higher engine speed side than in a lower engine speed side. As one example of control for the compression end temperature Tx, an internal EGR amount is controlled to be increased larger in the higher engine speed side than in the lower engine speed side, to raise a compression initial temperature T0 which is an in-cylinder temperature at a start timing of a compression stroke. This makes it possible to perform the compression self-ignition combustion under a lean air-fuel ratio in a wider engine speed range to effectively enhance engine thermal efficiency.

14 Claims, 8 Drawing Sheets

(56) References Cited

U.S. PATENT DOCUMENTS

| | | | |
|---|---|---|---|
| 2002/0059914 A1* | 5/2002 | Yamaguchi et al. | 123/299 |
| 2004/0194746 A1* | 10/2004 | Yamaoka et al. | 123/90.15 |
| 2010/0043749 A1* | 2/2010 | Suda et al. | 123/406.41 |
| 2011/0180038 A1* | 7/2011 | Yamakawa et al. | 123/435 |
| 2011/0180047 A1* | 7/2011 | Yamakawa et al. | 123/564 |
| 2012/0111302 A1* | 5/2012 | Shishime et al. | 123/299 |

FOREIGN PATENT DOCUMENTS

| | | |
|---|---|---|
| JP | 2007-292060 A | 11/2007 |
| WO | 02/14665 A1 | 2/2002 |

* cited by examiner

ENGINE CONTROL METHOD AND APPARATUS

BACKGROUND OF THE INVENTION

1. Field of the Invention

The present invention relates to an engine control method and apparatus designed to allow a compression self-ignition combustion to be performed in at least a part of an engine operating region.

2. Description of the Background Art

Heretofore, in a spark-ignition gasoline engine having a spark plug, a method has been implemented which is designed to perform a compression self-ignition combustion based on self-ignition of an air-fuel mixture, in a partial engine load operating region, and to perform a spark-ignition (SI) combustion based on forced ignition of an air-fuel mixture by a spark plug, in another operating region on a higher engine load side than the partial engine load operating region, as disclosed in JP 2007-292060A.

As for the method designed to selectively use the compression self-ignition combustion and the spark-ignition (SI) combustion depending on engine load in the above manner, various techniques have heretofore been proposed. Specifically, the compression self-ignition combustion is a combustion mode where an air-fuel mixture self-ignites simultaneously at many positions in a combustion chamber, and considered to have a potential to provide higher efficiency than the commonly-used spark-ignition combustion. However, the compression self-ignition combustion has a problem with combustion controllability (i.e., preignition or knocking is more likely to occur) when the engine load is high, so that it is necessary to perform the spark-ignition combustion with high controllability, in a high engine load range. For this purpose, the two combustion modes, i.e., the compression self-ignition combustion and the spark-ignition combustion, are selectively used depending on engine load. This allows the compression self-ignition combustion to be adequately performed, but partially, so that engine thermal efficiency is enhanced in an engine operating region subject to the compression self-ignition combustion, which provides an advantage of being able to improve fuel economy performance.

In the engine disclosed in the JP 2007-292060A, the compression self-ignition combustion and the spark-ignition combustion are selectively used depending on engine speed as well as engine load. Specifically, the engine is designed to perform the compression self-ignition combustion primarily in a low engine speed range, and switch the compression self-ignition combustion to the spark-ignition combustion, in the remaining engine speed range. The reason for switching to the spark-ignition combustion in a high engine speed range is that, when the engine speed is high, a period where an air-fuel mixture is exposed to high temperatures and high pressures (high-temperature/high-pressure period) becomes relatively short, so that the air-fuel mixture is less likely to self-ignite, and misfire is more likely to occurs.

Meanwhile, it is known that, as means for enhancing the engine thermal efficiency, a technique may be employed which is designed to burn an air-fuel mixture under an air-fuel ratio leaner than a stoichiometric air-fuel ratio. Specifically, when air is introduced into the cylinder in an excess amount with respect to a fuel (gasoline) supply amount to perform combustion under a resulting lean air-fuel ratio, a combustion temperature can be lowered as compared with combustion under the stoichiometric air-fuel ratio, so that an exhaust loss and a cooling loss of the engine are reduced, which makes it possible to further enhance the engine thermal efficiency.

Therefore, if the compression self-ignition combustion can be performed under the condition that the air-fuel ratio is set to a lean value, it is expected to make it possible to more effectively enhance the engine thermal efficiency so as to improve the fuel economy performance.

However, it is assumed that, if the air-fuel ratio is simply enleaned, self-ignitability of an air-fuel mixture will deteriorate, and thereby misfire is more likely to occur when switched to the compression self-ignition combustion. Consequently, an engine speed range which allows for the compression self-ignition combustion is narrowed, and thereby the effect of enhancing the engine thermal efficiency deteriorates. Thus, there is a need for a technique capable of allowing the compression self-ignition combustion to be performed in a wider engine speed range, even under an enleaned air-fuel ratio.

SUMMARY OF THE INVENTION

In view of the above circumstances, it is an object of the present invention to allow a compression self-ignition combustion under a lean air-fuel ratio to be performed in a wider engine speed range so as to further effectively enhance engine thermal efficiency.

In order to achieve the above object, the present invention provides a method for controlling an engine. The method comprises a step of allowing a compression self-ignition combustion under an air-fuel ratio leaner than a stoichiometric air-fuel ratio to be performed at least in a partial-load range of the engine, wherein, under a condition that an engine speed varies at a same load in an engine operating region of the compression self-ignition combustion, a compression end temperature, which is an in-cylinder temperature just before an air-fuel mixture self-ignites, is controlled to be raised higher in a higher engine speed side than in a lower engine speed side.

The present invention also provides an apparatus for controlling an engine. The apparatus comprises a controller adapted to control respective sections of the engine to allow a compression self-ignition combustion under an air-fuel ratio leaner than a stoichiometric air-fuel ratio to be performed at least in a partial-load range of the engine, wherein the controller is operable, under a condition that an engine speed varies at a same load in an engine operating region of the compression self-ignition combustion, to control a compression end temperature, which is an in-cylinder temperature just before an air-fuel mixture self-ignites, in such a manner that it is raised higher in a higher engine speed side than in a lower engine speed side.

DESCRIPTION OF THE PREFERRED EMBODIMENTS

<Researches Before Reaching the Present Invention>

(1-1) Discussion about Air-Fuel Ratio

As means for enhancing engine thermal efficiency, a technique may be employed which is designed to burn an air-fuel mixture under an air-fuel ratio leaner than a stoichiometric air-fuel ratio, as described in the "BACKGROUND OF THE INVENTION". Based on making the air-fuel ratio lean, a combustion temperature of the air-fuel mixture is lowered, so that an exhaust loss and a cooling loss are reduced to provide enhanced engine thermal efficiency.

A gasoline engine designed to perform such a lean combustion (lean-burn gasoline engine) has been developed for years. For example, a gasoline engine designed to be operated using an air-fuel mixture having an air-fuel ratio set to a large value of up to about 20 (by comparison, the stoichiometric air-fuel ratio is generally about 14.7) has been put to practical use in the past. However, even if the air-fuel ratio is set to about 20, it is difficult to expect significant improvement in the engine thermal efficiency, and there is a problem of deterioration in emission performance. Specifically, a three-way catalyst capable of simultaneously purifying HC, CO and NOx contained in exhaust gas is generally provided in an exhaust passage of an engine. The three-way catalyst can bring out maximum performance when the air-fuel ratio is equal to the stoichiometric air-fuel ratio. Thus, for example, when the air-fuel ratio is enleaned up to about 20, NOx purifying performance will significantly deteriorate.

In cases where the NOx purifying performance cannot be expected from the three-way catalyst, if a NOx catalyst, such as NOx storage/reduction catalyst, is provided in addition to the three-way catalyst, NOx can be obviously purified to some extent to suppress a NOx emission level. In the previously developed lean-burn engine, the NOx problem has been cleared by providing the NOx catalyst in the exhaust passage. However, the performance of the NOx catalyst has limitations. For example, under an air-fuel ratio of about 20, even if the NOx catalyst is additionally provided, it becomes difficult to meet emission regulations which are becoming more stringent year after year.

Under the above circumstances, the inventors of this application came up with a concept of reducing an amount of NOx itself to be generated by combustion (raw NOx amount), by drastically enleaning the air-fuel ratio with respect to the stoichiometric air-fuel ratio. Specifically, it is intended to drastically enlean the air-fuel ratio so as to lower a combustion temperature of an air-fuel mixture to a value less than a NOx generation temperature (a temperature at which NOx is actively generated) to significantly reduce the NOx generation amount.

Figure 1:
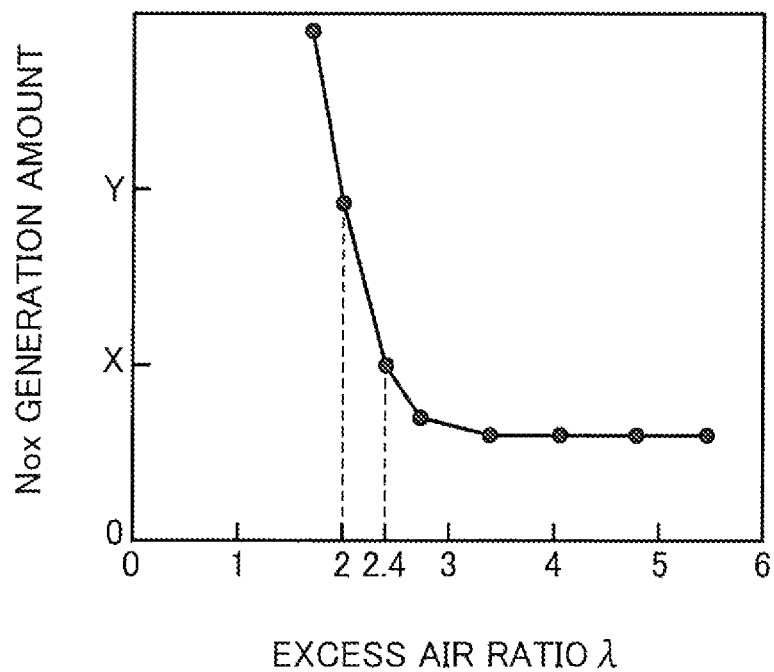
FIG. 1 is a graph showing a relationship between an excess air ratio λ and an NOx generation amount.

FIG. 1 is a graph showing a relationship between an excess air ratio $\lambda$ and the NOx generation amount (combustion-generated raw NOx amount). In this graph, the value Y on the vertical axis indicates a NOx amount which can sufficiently meet the emission regulations if a NOx catalyst is provided, and the value X on the vertical axis indicates a NOx amount which can sufficiently meet the emission regulations without providing a NOx catalyst.

As can be seen from FIG. 1, when the excess air ratio $\lambda$ which is a ratio of an actual air-fuel ratio to the stoichiometric air-fuel ratio (a value obtained by dividing an actual air-fuel ratio by the stoichiometric air-fuel ratio) is increased to 2.4 (equal to an actual air-fuel ratio of about 35) or more, the combustion-generated raw NOx amount becomes equal to or less than the reference value X, so that it becomes possible to sufficiently meet the emission regulations without providing a NOx catalyst. When the excess air ratio $\lambda$ is in the range of 2 to less than 2.4, the NOx amount is less than the reference value Y although it becomes greater than the reference value X, so that it is possible to sufficiently meet the emission regulations as long as a NOx catalyst is provided.

For the above reasons, it is proven that the problem concerning the NOx emission level can be cleared by setting the excess air ratio $\lambda$, i.e., a ratio of an actual air-fuel ratio to the stoichiometric air-fuel ratio, to 2 or more, more preferably 2.4 or more. When the excess air ratio $\lambda$ is set to 2.4 or more ($\lambda \geq 2.4$), a NOx catalyst can be omitted, which is more advantageous in terms of cost, than when the excess air ratio $\lambda$ is set in the range of 2 to less than 2.4.

However, when it is attempted to burn an air-fuel mixture under the ultra-lean air-fuel ratio ($\lambda \geq 2$ (or 2.4)), a flame propagation velocity after ignition of the air-fuel mixture is significantly lowered, as compared with combustion under the stoichiometric air-fuel ratio. Thus, if the same spark-ignition combustion as that in a conventional gasoline engine is used for this concept, misfire is more likely to occur, and thereby it is difficult to practically realize the concept. In contrast, when a compression self-ignition combustion where an air-fuel mixture self-ignites simultaneously at many positions, is used for the concept, there is a possibility that an adequate combustion can be performed even under the ultra-lean air-fuel ratio ($\lambda \geq 2$), irrespective of the lowing of the flame propagation velocity, if only an environment allowing self-ignition can be created. With a focus on this point, the inventors further studied the following factors.

(1-2) Discussion about Compression Self-Ignition Combustion

Figure 2:
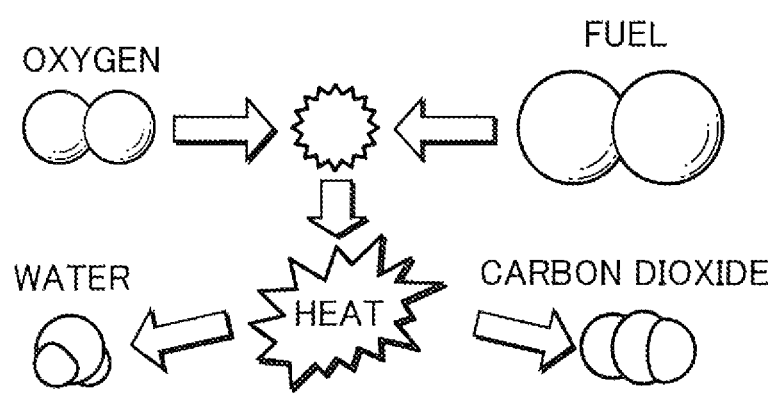
FIG. 2 is an explanatory diagram showing a state in which a compression self-ignition combustion occurs through a chemical reaction between fuel and oxygen.

The compression self-ignition combustion in a gasoline engine is a phenomenon that fuel (gasoline) and oxygen ($O_2$) chemically react with each other on an autonomous basis, as shown in FIG. 2. When a chemical reaction between fuel and oxygen, water and carbon dioxide are produced while generating heat due to an internal energy difference. Whether such a chemical reaction occurs is determined by a temperature and a pressure of an air-fuel mixture, and a high-temperature/high-pressure period (period where the air-fuel mixture is exposed to high temperatures and high pressures). More specifically, a molecular velocity becomes higher as the temperature becomes higher, and a molecular collision frequency becomes higher as the pressure (i.e., molecular density) becomes higher. Thus, as the temperature and the pressure become higher, energy resulting from collision between fuel and oxygen is more increased, and the chemical reaction is more likely to occur. Then, after the period where the temperature and the pressure are high (high-temperature/high-pressure period) continues to some extent, the chemical reaction between fuel and oxygen starts. Subsequently the chemical reaction will progress in a chain-reaction manner, and combustion of the air-fuel mixture will be completed.

Figure 3:
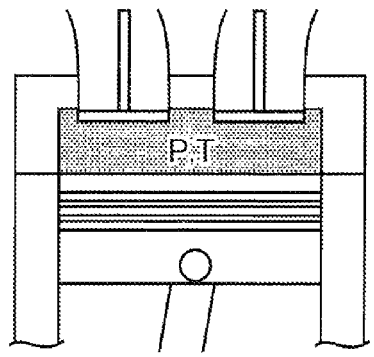
FIG. 3 is a schematic diagram showing a typical reciprocating gasoline engine.

FIG. 3 schematically shows a typical gasoline engine comprising a piston and a cylinder. In a reciprocating gasoline engine as shown in FIG. 3, the inventors studied a condition of an in-cylinder temperature T and an in-cylinder pressure P for causing an air-fuel mixture to self-ignite at an optimal ignition timing (Minimum Advance for Best Torque; hereinafter referred to as "MBT ignition timing"), while taking into account the aforementioned characteristics of the compression self-ignition combustion. Although the MBT ignition timing (optimal ignition timing) varies depending on engine load, it is roughly in the range from a timing corresponding to a compression top dead center (compression TDC) (during high engine loads) to 3 degrees CA ATDC (during low engine loads). As is well known, the "compression TDC" means a top dead center between a compression stroke and a subsequent expansion stroke, and the "degrees CA ATDC" means a crank angle after a top dead center.

As a prerequisite to causing an air-fuel mixture to self-ignite at the MBT ignition timing, it is necessary to control the in-cylinder temperature T and the in-cylinder pressure P just before the MBT ignition timing, according to engine speed. Specifically, the high-temperature/high-pressure period of the air-fuel mixture becomes shorter as the engine speed becomes higher, and becomes longer as the engine speed becomes lower. Thus, it is necessary to raise the in-cylinder temperature and pressure T, P just before the MBT ignition timing, in a high engine speed range where the high-temperature/high-pressure period is relatively short, and to lower the in-cylinder temperature and pressure T, P just before the MBT ignition timing, in a low engine speed region where the high-temperature/high-pressure period is relatively long. As described above, the MBT ignition timing is limited to a vicinity of a compression TDC. Thus, in the following description, an in-cylinder temperature and an in-cylinder pressure at a compression TDC will be used as respective representative examples of the in-cylinder temperature T and the in-cylinder pressure P just before the MBT ignition timing (i.e., just before the air-fuel mixture self-ignites), and will be referred to respectively as "compression end temperature Tx" and "compression end pressure Px".

Figure 4:
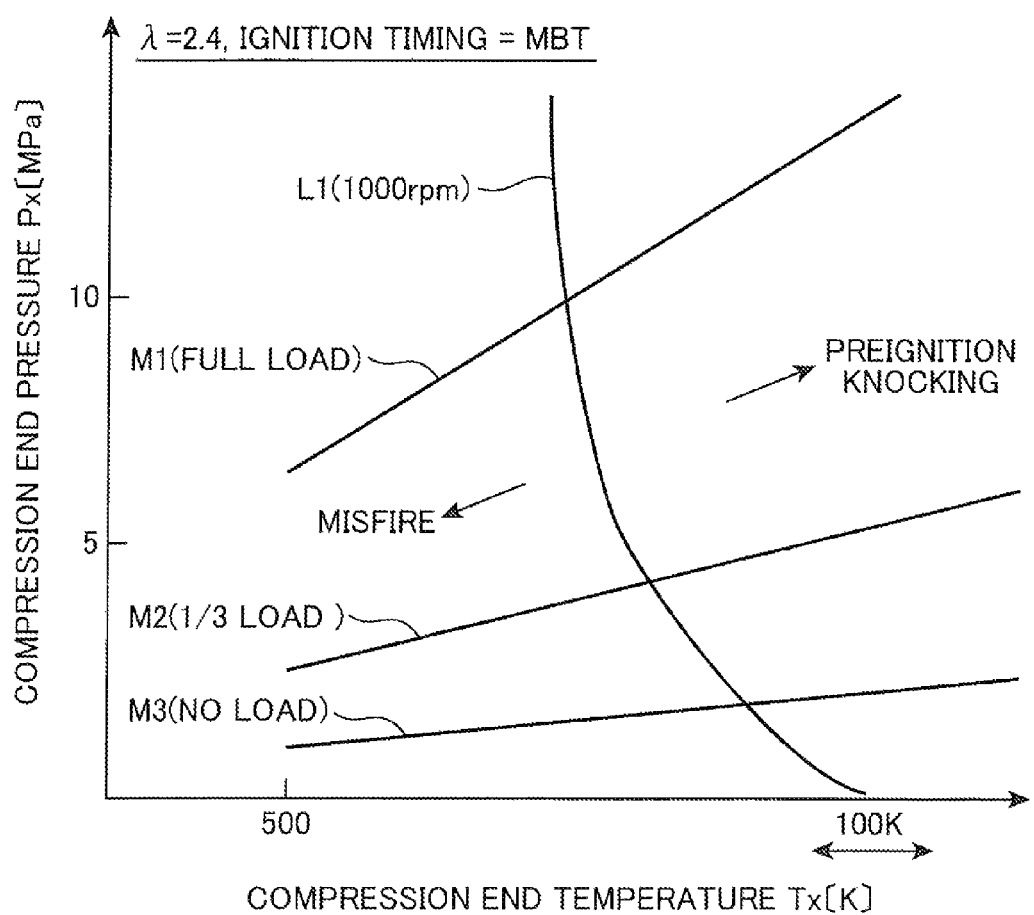
FIG. 4 is a graph prepared by calculating a condition of a compression end temperature and a compression end pressure for causing an air-fuel mixture to self-ignite at an MBT ignition timing when an engine speed is 1000 rpm.

FIG. 4 is a graph prepared by calculating a condition of the compression end temperature Tx and the compression end pressure Px (the in-cylinder temperature and the in-cylinder pressure at a compression TDC) for causing an air-fuel mixture to self-ignite at the MBT ignition timing (optimal ignition timing) when the engine speed is 1000 rpm, based on an elementary reaction calculation and a state equation. In the calculation for this graph, the excess air ratio λ, i.e., a ratio of an actual air-fuel ratio to the stoichiometric air-fuel ratio, was set to 2.4, and a compression ratio was set to 18. The excess air ratio λ was set to 2.4, because the combustion-generated NOx amount (raw NOx amount) itself can be sufficiently reduced so as to meet the emission regulations even if a NOx catalyst is omitted (see the section (1-1)). Further, the compression ratio was set to 18, because it is necessary to raise a temperature and a pressure of the air-fuel mixture based on a compression ratio greater that that in a standard reciprocating gasoline engine, in order to cause the air-fuel mixture to self-ignite under the ultra-lean air-fuel ratio (λ=2.4), and the high-compression ratio is also advantageous in terms of engine thermal efficiency.

In the graph of FIG. 4, the line L1 is formed by connecting respective values of the compression end temperature Tx and the compression end pressure Px required for self-ignition of the air-fuel mixture at the MBT ignition timing. Thus, it is meant that, if the values Tx, Px are plotted on the line L1, a timing of the self-ignition is coincident with the MBT ignition timing.

Further, in the graph of FIG. 4, each of the lines M1, M2, M3 represents a value of the engine load based on an amount of fresh air to be introduced into a cylinder of the engine, wherein the line M1, the line M2 and the line M3 represent a full engine load, a ⅓ engine load and a no engine load, respectively. Specifically, on the assumption that the compression ratio is fixed at 18, a combustion chamber volume at a compression TDC is maintained constant. Thus, according to the state equation, the fresh air amount (engine load) is proportional to the compression end pressure Px, and inversely proportional to the compression end temperature Tx. Therefore, the plurality of lines M1 to M3 each having a different slope can be defined for each value of the engine load. In FIG. 4, when each value of the engine load is expressed in indicated mean effective pressure (IMEP), an IMEP at the full engine load (M1), an IMEP at the ⅓ engine load (M2) and an IMEP at the no engine load (M3) are 1300 kPa, 500 kPa and 200 kPa, respectively.

As shown in the graph of FIG. 4, the condition for causing the air-fuel mixture to self-ignite at the MBT ignition timing (line L1) is more largely shifted to a high-temperature/low-pressure side as the engine load becomes lower, and conversely more largely shifted to a low-temperature/high-pressure side as the engine load becomes higher. Specifically, when the engine load is low and thereby the fresh air amount is small, the molecular collision frequency becomes lower. Thus, in order to induce the chemical reaction, it is necessary to raise the compression end temperature Tx to increase the molecular velocity. On the other hand, when the engine load is high and thereby the fresh air amount is large, the molecular collision frequency becomes higher. Thus, in order to induce the self-ignition at the same timing, it is necessary to lower the compression end temperature Tx to reduce the molecular velocity.

If the condition of the compression end temperature Tx and the compression end pressure Px is deviated to a higher temperature/higher pressure side (upper right side of the graph) than the line L1, the self-ignition timing becomes earlier than the MBT ignition timing. If the temperature-pressure condition are deviated to a lower temperature/lower pressure side (lower left side of the graph) than the line L1, the self-ignition timing becomes later than the MBT ignition timing. Thus, if the temperature-pressure condition is largely deviated to the higher temperature/higher pressure side or the lower temperature/lower pressure side with respect to the line L1, pre-ignition or knocking will occur on the higher temperature/higher pressure side, or misfire will occur on the lower temperature/lower pressure side.

Figure 5:
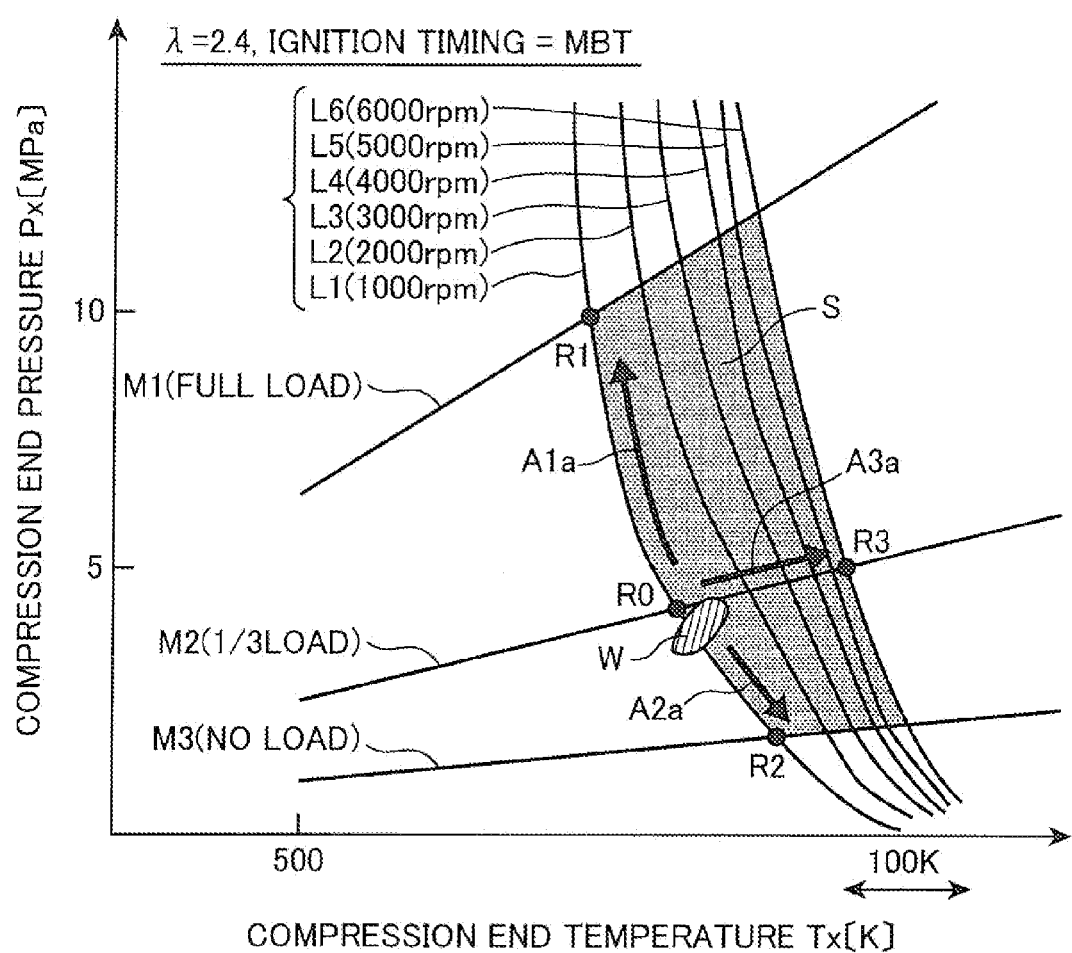
FIG. 5 is a graph prepared by calculating conditions of the compression end temperature and the compression end pressure for causing the air-fuel mixture to self-ignite at the MBT ignition timing when the engine speed is 1000, 2000, 3000, 4000, 5000 or 6000 rpm.

FIG. 5 shows a result obtained by performing the same calculation as that for FIG. 4 while variously changing only the engine speed on the basis of the graph of FIG. 4. In the lines L1 to L6 illustrated in FIG. 5, the line L1 represents the temperature-pressure condition when the engine speed is 1000 rpm, as with the line L1 in FIG. 4, and the remaining lines L2, L3, L4, L5, L6 represent temperature-pressure conditions when the engine speed is 2000 rpm, 3000 rpm, 4000 rpm, 5000 rpm and 6000 rpm, respectively.

As is clear from the graph of FIG. 5, each of the lines L2 to L6 representing the temperature-pressure conditions at the respective engine speeds 2000 rpm to 6000 rpm slopes downwardly and rightwardly, with a tendency similar to the line L1 at 1000 rpm. Further, the lines L1 to L6 are located in order of L1, L2, - - - , L6 in a rightward direction, which shows that it is necessary to raise the compression end temperature Tx along with an increase in the engine speed, so as to ensure the self-ignition. This is because the period where the air-fuel mixture is exposed to high temperatures and high pressures (high-temperature/high-pressure period) becomes shorter as the engine speed becomes higher, and thereby it is necessary to induce the chemical reaction within a shorter period of time.

In FIG. 5, each of the lines L1 to L6 has the downward and rightward sloping, which shows that the temperature-pressure condition for causing the air-fuel mixture to self-ignite at the MBT ignition timing is more largely shifted to a high-temperature/low-pressure side as the engine load becomes lower, and more largely shifted to a low-temperature/high-pressure side as the engine load becomes higher, irrespective of engine speed values. However, in reality, if an initial temperature on a compression stroke (compression initial temperature) and the compression ratio are maintained constant, the compression end temperature Tx is not changed according to an increase/decrease in the engine load (i.e., increase/reduction in the fresh air amount), although only the compression end pressure Px is changed. Therefore, it is substantially impossible to create an environment meeting the temperature-pressure conditions as indicated by the lines L1 to L6 in FIG. 5 (condition in the gray region S), under a constant compression ratio, for example, unless the engine has a device capable of freely heating and cooling fresh air.

For example, the zone W indicated by the hatched lines in FIG. 5 denotes a range of the compression end temperature Tx and the compression end pressure Px to be obtained by compressing a certain amount of fresh air having a normal temperature (which corresponds to a compression initial temperature of 75° C.) and an atmospheric pressure (0.1 MPa), at a compression ratio of 16 to 18. As seen in FIG. 5, when fresh air having a normal temperature and an atmospheric pressure is compressed at a compression ratio of 16 to 18, the range denoted by the zone W can partly meet the temperature-pressure condition for causing the air-fuel mixture to adequately self-ignite (condition in the gray region S). However, for example, if the fresh air amount (engine load) is reduced from that in the zone W, the range of the compression end temperature Tx and the compression end pressure Px is shifted to a lower pressure side than a position of the zone W (to a side just below the zone W), and deviated from the temperature-pressure condition for causing the air-fuel mixture to adequately self-ignite (region S). Thus, it is proven that the compression self-ignition combustion cannot be adequately produced over the entire engine load/engine speed range simply by increasing/reducing the fresh air amount.

If fresh air can be freely heated and cooled, the compression self-ignition combustion can be adequately produced over the entire engine load/engine speed range in theory. However, as a prerequisite to meeting the entire temperature-pressure condition as indicated by the region S in FIG. 5, it is necessary to heat and cool fresh air over a fairly-wide temperature range. Thus, such a technique would not be realistic in view of problems in terms of cost, controllability, etc.

(1-3) Solution

Then, the inventors came up with an idea of creating substantially the same condition as the region S indicative of the condition for the adequate compression self-ignition combustion, by additionally performing supercharging and/or internal exhaust gas recirculation (internal EGR) while changing the engine compression ratio in a range equal to or less than 18.

As means for changing the compression ratio in the range equal to or less than 18, a technique may be employed which is designed to retard an intake-valve closing timing under a condition that a geometric compression ratio of an engine is set to 18. When the intake-valve closing timing is retarded, a compression start timing is retarded, so that a substantial compression ratio (effective compression ratio) of the engine becomes less than 18.

An operation of reducing the effective compression ratio leads to lowering of the compression end temperature Tx, so that it is effective particularly in a low engine speed/high engine load range (upper left portion of the region S in FIG. 5). However, when the intake-valve closing timing is retarded so as to reduce the effective compression ratio, the fresh air amount (amount of fresh air to be introduced into the cylinder) is reduced. Thus, it is anticipated that, if the effective compression ratio is simply reduced, the compression end pressure Px is excessively lowered as compared with the temperature-pressure condition for the self-ignition in the low engine speed/high engine load range, which causes insufficiency in torque, or misfire. Therefore, in conjunction with a reduction in the effective compression ratio, supercharging is performed to compensate for a reduction of the fresh air amount.

For example, in a high engine speed range (right portion of the region S) or a low engine load range (lower portion of the region S), it is necessary to raise the compression end temperature Tx. In this case, internal EGR for causing high-temperature burned gas to remain in the cylinder is performed. Through the internal EGR, it becomes possible to raise the compression end temperature Tx while raising the initial temperature on a compression stroke (compression initial temperature), so as to create a temperature-pressure condition suitable for the compression self-ignition combustion in the high engine speed/low engine load region. As means for performing the internal EGR, a technique may be employed which is designed to provide a negative overlap period where both of an intake valve and an exhaust valve are closed during a transition from an exhaust stroke to a subsequent intake stroke.

Embodiments of the Present Invention (2-1) Overall Configuration

Figure 6:
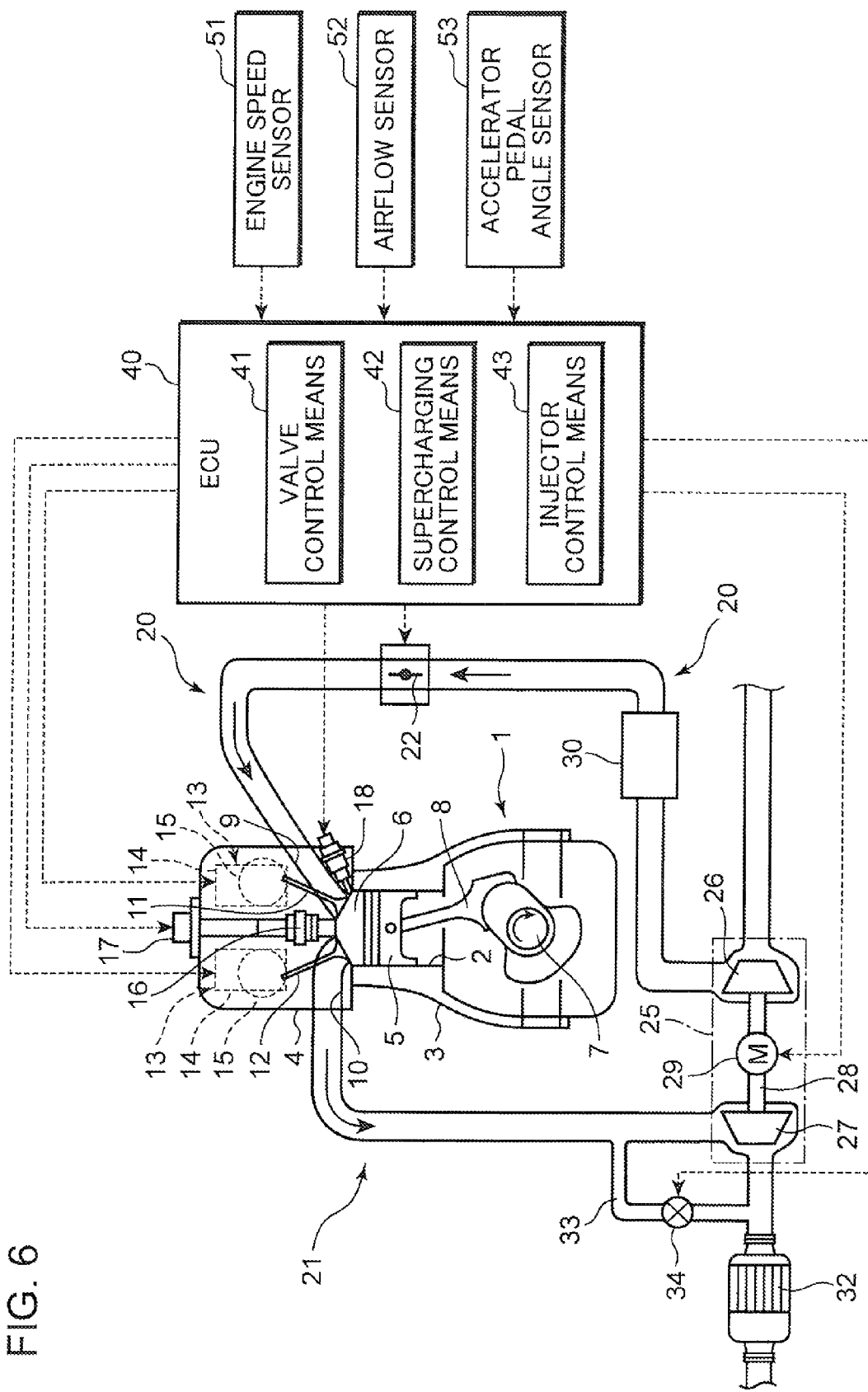
FIG. 6 is a schematic diagram showing an overall configuration of an engine according to one embodiment of the present invention.

FIG. 6 is a schematic diagram showing an overall configuration of an engine according to one embodiment of the present invention made based on the above basic theory. The engine illustrated in FIG. 6 is a multi-cylinder gasoline engine including an engine body 1 which comprises a cylinder block 3 having a plurality of cylinders 2 (only one of them is illustrated in FIG. 6) arranged in a direction perpendicular to the drawing sheet, and a cylinder head 4 disposed on the cylinder block 3. In this embodiment, fuel to be supplied to the engine body 1 may be any type consisting mainly of gasoline, wherein a content of the fuel may consist only of gasoline, or may contain gasoline and other component such as ethanol (ethyl alcohol).

A piston 5 is inserted in each of the cylinders 2 of the engine body 1 in a reciprocatingly slidable manner. The piston 5 is connected to a crankshaft 7 through a connecting rod 8 to allow the crankshaft 7 to be rotated about a central axis thereof according to a reciprocating movement of the piston 5.

A combustion chamber 6 is defined just above the piston 5, and the cylinder head 4 is formed with an intake port 9 and an exhaust port 10 each opened to the combustion chamber 6, and provided with an intake valve 11 and an exhaust valve 12 for opening and closing respective ones of the ports 9, 10. Each of the intake valve 11 and the exhaust valve 12 is adapted to be openably/closably driven by a respective one of a pair of valve operating mechanisms 13 each including a camshaft (not shown) provided in the cylinder head 4, in conjunction with the rotation of the crankshaft 7.

A VVL mechanism 14 and a VVT mechanism 15 are incorporated in each of the valve operating mechanisms 13 for the intake valve 11 and the exhaust valve 12. The VVL is an abbreviation for Variable Valve Lift, and the VVL mechanism 14 is adapted to variably set a lift amount (valve opening amount) of each of the intake and exhaust valves 11, 12. The VVT is an abbreviation for Variable Valve Timing, and the VVT mechanism 15 is adapted to variably set opening and closing timings (phase angles) of each of the intake and exhaust valves 11, 12. As for each of the VVL mechanism 14 and the VVT mechanism 15, various types have already been put into practical use, and commonly known, and detailed description thereof will be omitted here. For example, a type disclosed in JP 2007-85241A may be employed.

A spark plug 16 is provided in the cylinder head 4 of the engine body 1 in such a manner that it is exposed to the combustion chamber 6 of each of the cylinders 2 from thereabove. The spark plug 16 is electrically connected to an ignition circuit 17 provided on the cylinder head 4, and adapted to generate a spark discharge in response to a supply of electric power from the ignition circuit 17 thereto. In the engine according to this embodiment, the compression self-ignition combustion is performed throughout the entire engine operating region, and a spark-ignition combustion is basically not performed, as described later. However, for example, during engine starting and during extremely cold conditions, the spark-ignition combustion is necessary to eliminate a risk of misfire which is likely to occur in the compression self-ignition combustion. The spark plug 16 is used at least in such a case.

An injector 18 is provided in the cylinder head 4 in such a manner that it is exposed to the combustion chamber 6 laterally from an intake side of the combustion chamber 6. The injector 10 is adapted to inject fuel (consisting mainly of gasoline) therefrom into the combustion chamber 6 in an intake stroke, etc., of the engine, so as to mix the injected fuel with air to form an air-fuel mixture having a desired air-fuel ratio in the combustion chamber 6.

In the above engine body 1, a geometric compression ratio which is determined by a stroke volume (swept volume of the piston 5) and a volume of the combustion chamber at a timing when the piston 5 is in a TDC position, is set to 18.

An intake passage 20 and an exhaust passage 21 are connected to respective ones of the intake port 9 and the exhaust port 10 of the engine body 1. Specifically, the intake passage 20 is adapted to supply combustion air (fresh air) to the combustion chamber 6 therethrough, and the exhaust passage 21 is adapted to discharge burned gas (exhaust gas) produced in the combustion chamber 6, to outside the engine body 1 therethrough.

The intake passage 20 is provided with a throttle valve 22. In the engine according to this embodiment, the lift amount and the opening and closing timings of each of the intake and exhaust valves 11, 12 are variably set by operations of the VVL mechanism 14 and the VVT mechanism 15, as described above. Thus, an amount of intake air to be charged into the combustion chamber 6 can be adjusted to control an engine power output, without selectively opening and closing the throttle valve 22. Therefore, the throttle valve 22 is operated to shut off the intake passage 20, for example, during emergency stop of the engine, and basically maintained at a fully-opened position, irrespective of engine operating state. Based on allowing the throttle valve 22 to be maintained at the fully-opened position, it becomes possible to achieve a reduction in pumping loss.

Fresh air passing through the intake passage 20 is compressed by a supercharger 25 and then supplied to the combustion chamber 6.

The supercharger 25 comprises a compressor 26 disposed inside the intake passage 20, a turbine 27 disposed inside the exhaust passage 21, a coupling shaft 28 coupling the compressor 26 and the turbine 27 together, and an electric motor 29 adapted to rotationally drive the coupling shaft 28. When the turbine 27 is rotated by receiving exhaust gas energy, the compressor 26 is rotated at a high speed interlockingly with the turbine 27, so that fresh air passing through the intake passage 20 is compressed and forcedly supplied to the combustion chamber 6. Further, according to need, the electric motor 29 is driven to assist the rotation of the compressor 26.

The compressor 26 is composed of a relatively-large impeller excellent in compression performance. The supercharger 25 adapted to compress intake air using the large-size compressor 26 can bring out high supercharging performance, particularly, in a high engine load range having large exhaust gas energy. Further, according to need, the rotation assist is performed by the electric motor 29, to allow intake air to be compressed with excellent response.

The intake passage 20 has a water-cooled intercooler 30 provided downstream of the compressor 26 and adapted to cool fresh air having a temperature raised by the supercharging.

The exhaust passage 21 is provided with a bypass passage 33 for allowing exhaust gas to bypass the turbine 27, and an electrically-operated wastegate valve 34 adapted to selectively open and close the bypass passage 33. Specifically, the wastegate valve 34 is operable to selectively open and close the bypass passage 33 so as to switch between a first state in which exhaust gas flows through the turbine 27 to rotationally drive the turbine 27, and a second state in which exhaust gas bypasses the turbine 27 to stop the rotation of the turbine 27.

The exhaust passage is also provided with a catalytic converter 32 for purifying exhaust gas. The catalytic converter 32 is provided with a three-way catalyst housed therein, and adapted to purify harmful components contained in exhaust gas passing therethrough by an action of the three-way catalyst.

(2-2) Control System

The above engine further comprises an ECU (Engine Control Unit) 40 composed, for example, of a conventional CPU, a conventional memory and others, to serve as control means (controller) for comprehensively controlling an operation of the engine.

The ECU 40 is electrically connected to a plurality of sensors installed at respective positions of the engine. More specifically, the ECU 40 is electrically connected to each of an engine speed sensor 51 for detecting a rotation speed of the crankshaft 7, an airflow sensor 52 for detecting an amount of fresh air passing through the intake passage 20, an accelerator pedal angle sensor 53 for detecting a depression amount (depression angle) of an accelerator (not shown) adapted to be depressed by a driver. Each of the sensors 51 to 53A is operable to input a detection value into the ECU 40 in the form of an electric signal.

Further, the ECU 40 is electrically connected to each of the VVL mechanism 14, the VVT mechanism 15, the ignition circuit 17, the injector 18, the throttle valve 22, the electric motor 29, and the wastegate valve 34, and adapted to output a driving control signal to each of these components.

Specific functions of the ECU 40 will be described below. As major functional elements, the ECU 40 has valve control means 41, supercharging control means 42 and injector control means 43.

The valve control means 41 is designed to drive the VVL mechanism 14 and the VVT mechanism 15 to variably set a lift characteristic (opening and closing timings and a lift amount) of each of the intake and exhaust values 11, 12. More specifically, based on changing the lift characteristic of each of the intake and exhaust values 11, 12, the valve control means 41 has a function of controlling an amount of burned gas remaining in the combustion chamber 6 (internal EGR amount), and a function of controlling an effective compression ratio of the engine.

Figure 7:
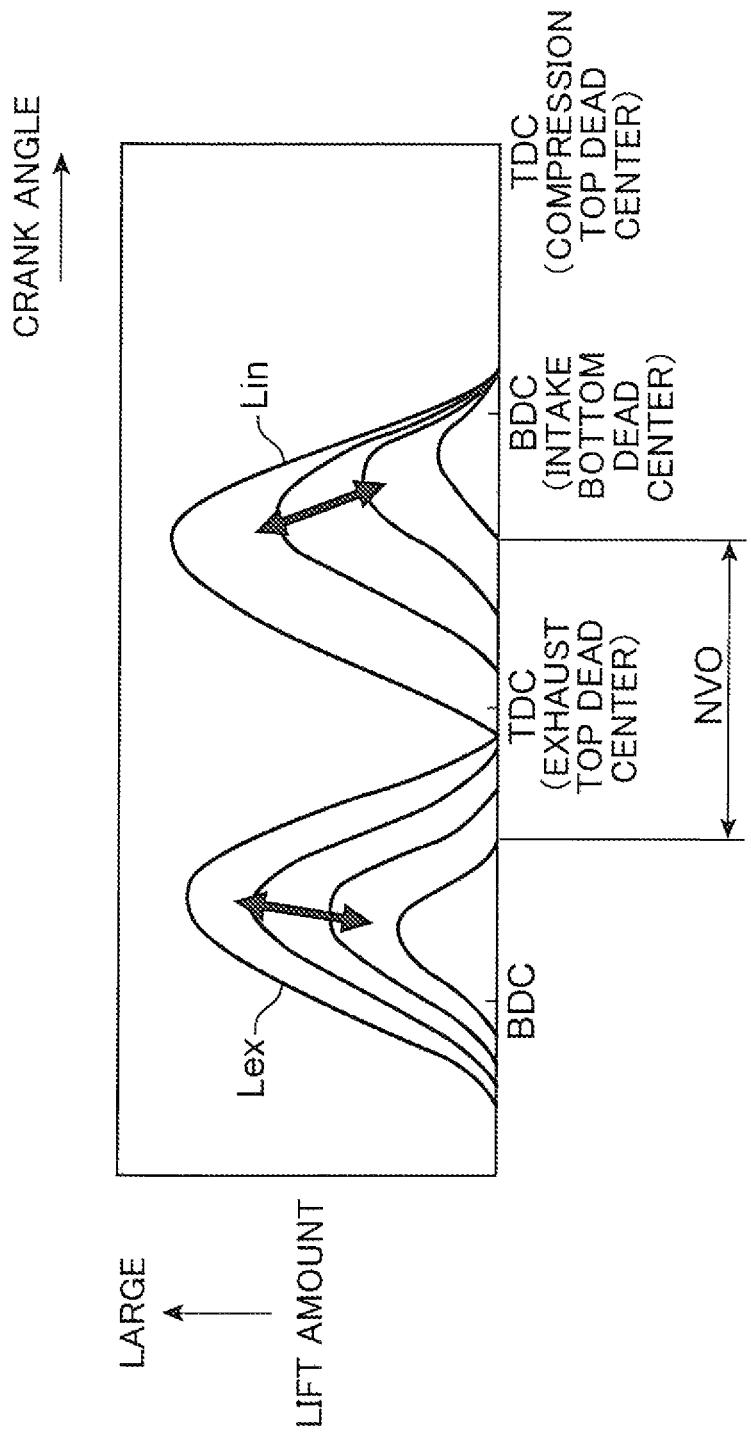
FIG. 7 is a chart showing one example of an intake/exhaust valve lift characteristic which is set to control an internal EGR amount.

In an operation of controlling the internal EGR amount, the valve control means 41 changes the lift characteristic of each of the intake and exhaust values 11, 12, for example, in a manner as shown in FIG. 7. In FIG. 7, the lines Lex represent the lift characteristic of the exhaust value 12, and the lines Lin represent the lift characteristic of the intake value 11. Further, the range NVO on the horizontal axis represents a negative overlap period where both of the intake and exhaust valves 11, 12 are closed during transition from an exhaust stroke to a subsequent intake stroke. The valve control means 41 is operable to drive the VVL mechanism 14 and the VVT mechanism 15 to change the lift characteristic of each of the intake and exhaust values 11, 12 so as to increase/reduce the negative overlap period NVO to adjust internal EGR amount (amount of burned gas remaining in the combustion chamber 6).

Figure 8:
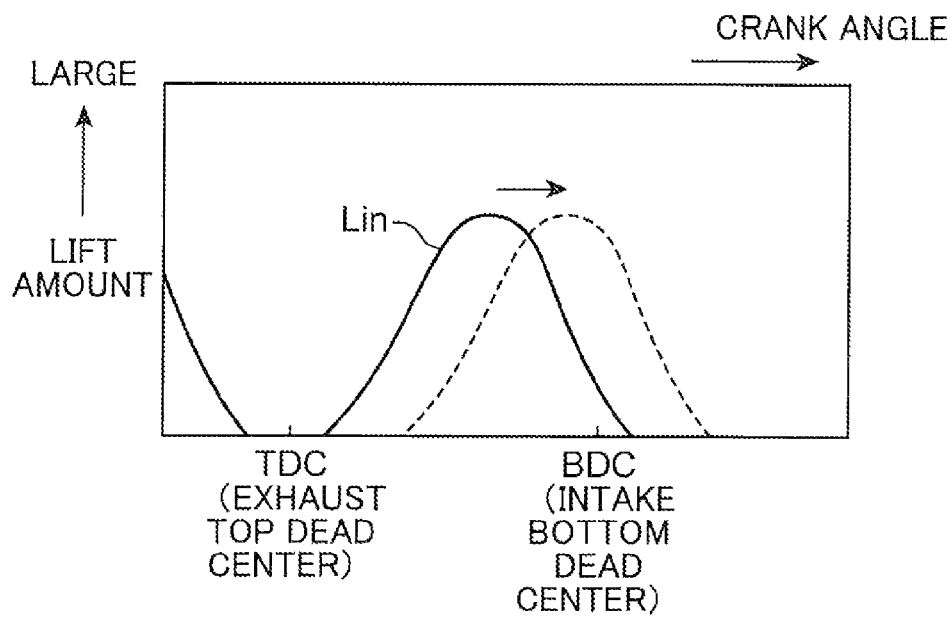
FIG. 8 is a chart showing one example of an intake valve lift characteristic which is set to control an effective compression ratio.

In an operation of controlling the effective compression ratio of the engine, the valve control means 41 changes the lift characteristic of the intake valve 11, for example, in a mode as shown in FIG. 8. Specifically, the intake valve 11 is normally closed at a timing adjacent to and on a retard side of an intake BDC (bottom dead center of an intake stroke) (a timing just after an intake BDC), as indicated by the solid waveform in FIG. 8. In this state, the effective compression ratio is identical to the geometric compression ratio (in this embodiment, 18). When the closing timing of the intake valve 11 is set to a largely retarded point with respect to the intake BDC, as indicated by the broken line in FIG. 8, a start timing of a subsequent compression stroke is retarded, and thereby the effective compression ratio (substantial compression ratio) of the engine is reduced. The valve control means 41 is operable to increase/reduce an amount of retard (retard amount) of the closing timing of the intake valve 11 so as to variably set the effective compression ratio of the engine.

As above, FIG. 8 illustrate one example in which the VVT mechanism 15 for the intake valve 11 is activated to retard an operation timing (opening and closing timings) of the intake valve 11 to a retard side as indicated by the broken line in FIG. 8. When only the VVT mechanism 15 is activated in the above manner, not only the closing timing but also the opening timing of the intake valve 11 are changed, and thereby the negative overlap period NOV illustrated in FIG. 7 is simultaneously changed. Thus, in cases where it is desirable to change only the effective compression ratio without changing the negative overlap period NOV, both of the VVL mechanism 14 and the VVT mechanism 15 may be activated to control the lift amount and the opening and closing timings in such a manner that only the closing timing of the intake valve 11 is variably changed while maintaining the opening timing of the intake valve 11 constant.

The supercharging control means 42 is designed to control the supercharging 25 by driving the electric motor 29 for the supercharger 25 according to need, and openably/closably driving the wastegate valve 34, so as to obtain an adequate supercharging pressure.

The injector control means 43 is designed to control an injection timing and an injection amount (injection period) of fuel to be injected from the injector 18 into the combustion chamber 6. More specifically, the injector control means 43 has a function of controlling an air-fuel ratio in the cylinder by calculating a target fuel injection amount for obtaining a given air-fuel ratio, based on information, such as an intake air amount (fresh air amount) input from the airflow sensor 52, and opening the injector 18 only for a time corresponding to the target fuel injection amount. In this embodiment, the injector control means 43 is operable to control the fuel injection amount from the injector 18 to allow an excess air ratio $\lambda$ which is a ratio of an actual air-fuel ratio to the stoichiometric air-fuel ratio to be maintained at 2.4 throughout the entire engine operating region. As for the fuel injection timing, fuel is injected during an intake stroke to sufficiently ensure a time for mixing between fuel and air.

(2-3) Specific Example of Control

How to control the engine depending engine load and engine speed by the above ECU 40 will be specifically described below. On an assumption that an engine operating state in which the engine speed is 1000 rpm and the engine load is a ⅓ engine load (IMEP=500 kPa), i.e., the point R0 in FIG. 5, is defined as a representative point, the following description will be made about a specific example of a control scheme to be executed when the engine load or engine speed is changed from the representative point R0.

Figure 9:
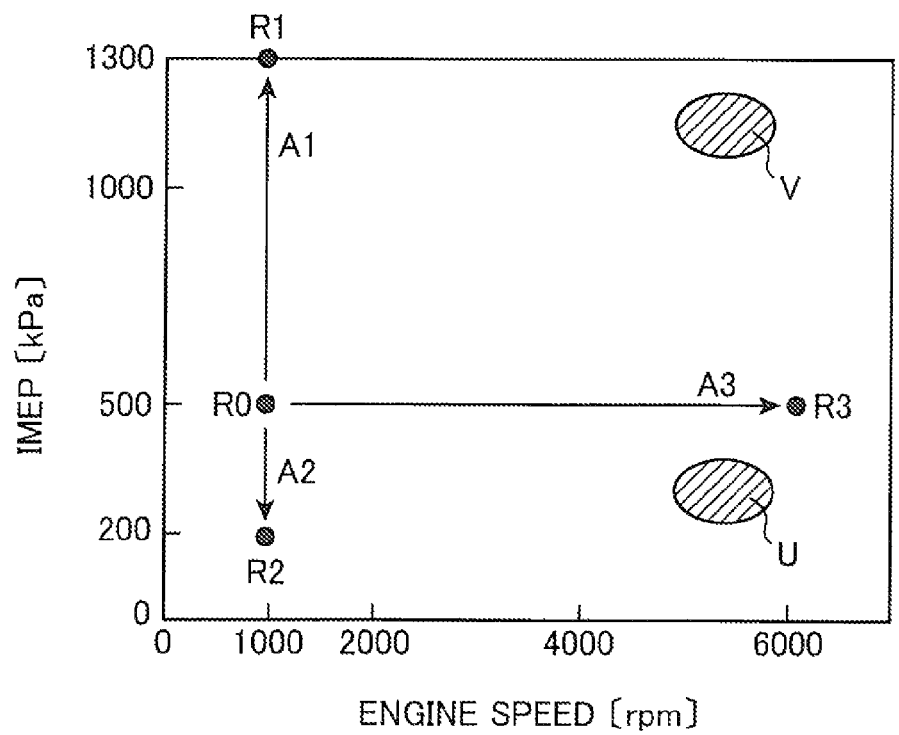
FIG. 9 is an explanatory diagram showing a change in engine operating state.
Figure 10:
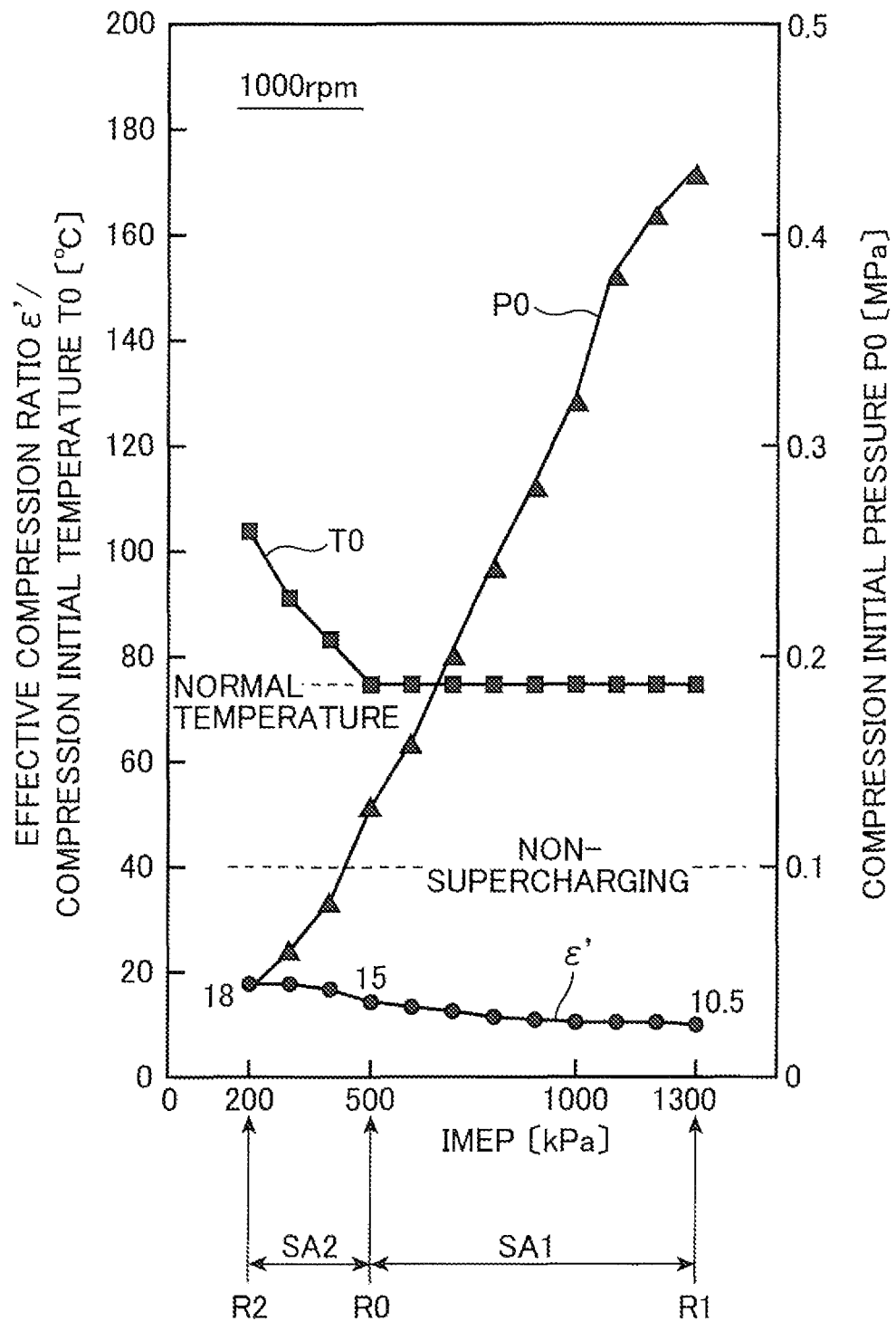
FIG. 10 is an explanatory diagram showing a control scheme to be executed when the engine operating state is changed along a engine load-axis direction.
Figure 11:
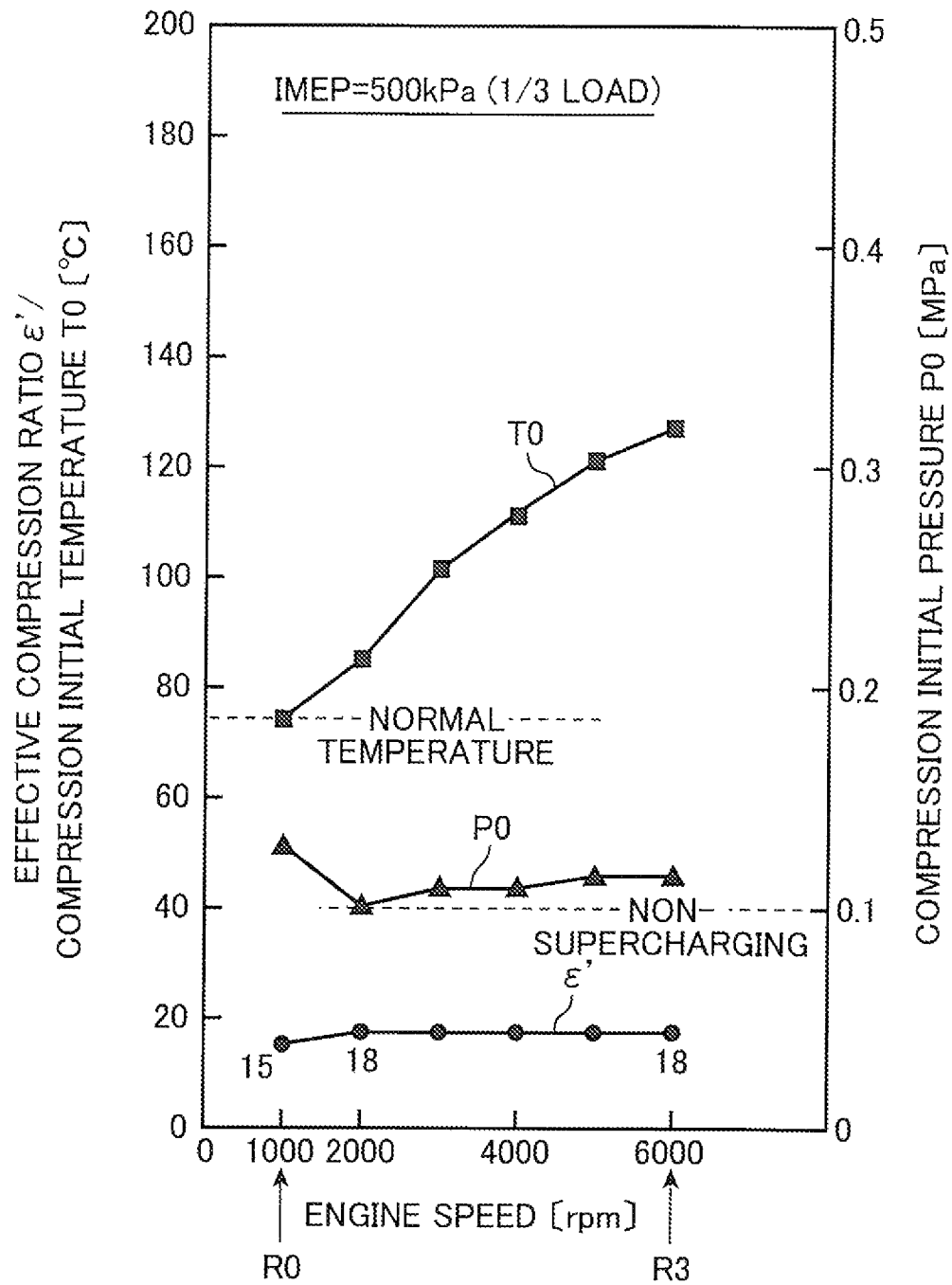
FIG. 11 is an explanatory diagram showing a control scheme to be executed when the engine operating state is changed along an engine speed-axis direction.

FIG. 9 is an engine operating zone map, wherein the horizontal axis represents the engine speed, and the vertical axis represents the engine load (IMEP). Each of the arrowed lines A1, A2 in FIG. 9 denotes that the engine operating state is changed along a direction of the engine load axis (engine load-axis direction), and FIG. 10 shows how each of the effective compression ratio $\epsilon'$, an initial temperature T0 on a compression stroke (compression initial temperature T0) and an initial pressure P0 on the compression stroke (compression initial pressure P0) is changed according to the change in engine load along the engine load-axis direction. Further, the arrowed line A3 in FIG. 9 denotes that the engine operating state is changed along a direction of the engine speed axis (engine speed-axis direction), and FIG. 11 shows how each of the effective compression ratio $\epsilon'$, the compression initial temperature T0 and the compression initial pressure P0 is changed according to the change in engine speed along the engine speed-axis direction. The terms "compression initial temperature T0" and "compression initial pressure P0" here are defined, respectively, as an in-cylinder temperature and an in-cylinder pressure at a timing when the intake valve 11 is closed. Further, in cases where the internal EGR for causing burned gas to remain in the cylinder (combustion chamber 6) is performed, the term "compression initial pressure P0" is defined as a partial pressure of fresh air in the cylinder (a value obtained by subtracting a partial pressure of burned gas from a total pressure in the cylinder) at a closing timing of the intake valve 11.

Firstly, a control scheme at the representative point R0 will be described. As shown in FIGS. 10 and 11, in the engine according to this embodiment, when the engine operating state is at the representative point R0 (engine speed=1000 rpm and IMEP=500 kPa), the effective compression ratio $\epsilon'$ is set to 15 which is less than the geometric compression ratio (=18), and the compression initial pressure P0 is set to be greater than a pressure in a non-supercharging mode (i.e., non-supercharging pressure; atmospheric pressure of 0.1 MPa) by a given value. On the other hand, the compression initial temperature T0 is maintained at a normal temperature (75° C.).

More specifically, at least the closing timing of the intake valve 11 is retarded by the valve control means 41, to reduce the effective compression ratio $\epsilon'$ from 18 to 15, and the supercharger 25 is driven by the supercharging control means 42, to set the compression initial pressure P0 to be greater than the non-supercharging pressure by a given value. The compression initial temperature T0 is maintained at the normal temperature, as mentioned above. Thus, the internal EGR (control for forming the negative overlap period to cause high-temperature burned gas to remain in the combustion chamber 6) is not performed. As above, the control scheme for reducing the effective compression ratio $\epsilon'$ and raising the compression initial pressure P0 (i.e., supercharging fresh air) is executed, because, in the graph of FIG. 5, a position of the representative point R0 is located slightly on a lower temperature/higher pressure side than the zone W which is a temperature-pressure range to be obtained when fresh air having the atmospheric pressure is compressed at a compression ratio of 16 to 18

In other words, as a prerequisite to causing an air-fuel mixture to self-ignite at the representative point R0 (engine speed=1000 rpm and IMEP=500 kPa) to adequately perform the compression self-ignition combustion, it is necessary to allow a condition of the compression end temperature Tx and the compression end pressure Px to correspond to the position of the representative point R0 in FIG. 5. However, a temperature-pressure condition corresponding to the representative point R0 is unable to be obtained simply by compressing fresh air having the atmospheric pressure, at a compression ratio of 16 to 18, as in the zone W, and it is necessary to shift the condition of the compression end temperature Tx and the compression end pressure Px slightly to a lower temperature/higher pressure side. Therefore, as shown in FIGS. 10 and 11, at the representative point R0, the effective compression ratio $\epsilon'$ is reduced to 15 while raising the compression initial pressure P0 (fresh air amount) by the supercharging, so as to lower the compression end temperature Tx and raise the compression end pressure Px, as compared with the zone W. In this manner, the temperature-pressure condition capable of adequately performing the compression self-ignition combustion at the representative point R0 (engine speed=1000 rpm and IMEP=500 kPa) can be created.

Secondly, a control scheme to be executed when the engine operating state is changed from the representative point R0 along the engine load-axis direction (see the arrowed lines A1, A2 in FIG. 9) will be described. When the engine operating state is shifted from the representative point R0 to a higher engine load side as indicated by the arrowed line A1, a control scheme for gradually reducing the effective compression ratio $\epsilon'$ while gradually raising the compression initial pressure P0, according to an increase in the engine load, is executed, as shown in the range SA1 illustrated in FIG. 10. On the other hand, the compression initial temperature T0 is maintained at the normal temperature, irrespective of engine load values.

Specifically, when the engine operating state is shifted from the representative point R0 to a higher engine load side, the closing timing of the intake valve 11 is further retarded as compared with that for the representative point R0, to gradually reduce the effective compression ratio $\epsilon'$ in a range less than 15, and finally the effective compression ratio $\epsilon'$ is reduced down to 10.5 at an operating point R1 corresponding, for example, to the full engine load (IMEP=1300 kPa). Further, along with a reduction in the effective compression ratio $\epsilon'$, the supercharging pressure based on the supercharger 25 is gradually raised to further raise the compression initial pressure P0 as compared with that for the representative point R0. On the other hand, the compression initial temperature T0 is maintained at the normal temperature without performing the internal EGR.

As above, on a higher engine load side than the representative point R0, the effective compression ratio $\epsilon'$ is gradually reduced while raising the compression initial pressure P0 by the supercharging (i.e., increasing the fresh air amount), along with an increase in the engine load. This corresponds to changing the temperature-pressure condition upwardly along the line L1 on the graph of FIG. 5 (see the arrowed line A1a). Thus, based on controlling the temperature/pressure in the above manner, the compression self-ignition combustion can be adequately performed in the high engine load range.

Specifically, as a prerequisite to allowing the adequate compression self-ignition combustion (combustion mode where an air-fuel mixture self-ignites at the MBT ignition timing) to be performed on a higher engine load side than the representative point R0, it is necessary to shift the condition of the compression end temperature Tx and the compression end pressure Px to the lower temperature/higher pressure side along with an increase in the engine load, as indicated by the arrowed line A1a extending upwardly along the line L1. For this purpose, in FIG. 10, when the engine load is increased from the representative point R0, the effective compression ratio $\epsilon'$ is reduced while raising the compression initial pressure P0 (fresh air amount) by the supercharging. This makes it possible to lower the compression end temperature Tx while raising the compression end pressure Px, with respect to the representative point R0, as indicated by the arrowed line A1a in FIG. 5, so as to continue the adequate compression self-ignition combustion toward a higher engine load side.

Thirdly, a control scheme to be executed when the engine operating state is changed from the representative point R0 on a lower engine load side as indicated by the arrowed line A2 in FIG. 9 will be described. In this case, a control scheme for gradually increasing the effective compression ratio $\epsilon'$ and raising the compression initial temperature T0 while gradually lowering the compression initial pressure P0, according to an increase in the engine load, is executed, as shown in the range SA2 illustrated in FIG. 10.

Specifically, when the engine operating state is shifted from the representative point R0 to a lower engine load side, a retard amount of the closing timing of the intake valve 11 is set to be less than that for the representative point R0, to gradually increase the effective compression ratio $\epsilon'$ in a range equal to or greater than 15, and finally the effective compression ratio $\epsilon'$ is increased up to 18 equal to the geometric compression ratio, at an operating point R2 corresponding, for example, to the no engine load (IMEP=200 kPa). Further, in conjunction with a reduction in the effective compression ratio $\epsilon'$, the internal EGR is performed to gradually increase an amount of burned gas remaining in the cylinder (combustion chamber 6) so as to gradually raise the compression initial temperature T0 in a range equal to or greater than the normal temperature. In addition, the supercharging using the supercharger 25 is stopped when the engine operating state is shifted slightly on a lower engine load side than the representative point R0, and the internal EGR is performed in the above manner to lower a partial pressure of fresh air in the cylinder, so that the compression initial pressure P0 is lowered down to less than the atmospheric pressure along with a decrease of the engine load.

As above, on a lower engine load side than the representative point R0, the effective compression ratio $\epsilon'$ is gradually increased while lowering the compression initial pressure P0 by the internal EGR (i.e., reducing the fresh air amount), along with a decrease in the engine load. This corresponds to changing the temperature-pressure condition downwardly along the line L1 on the graph of FIG. 5 (see the arrowed line A2a). Thus, based on controlling the temperature/pressure in the above manner, the compression self-ignition combustion can be adequately performed in the low engine load range.

Specifically, as a prerequisite to allowing the adequate compression self-ignition combustion (combustion mode where an air-fuel mixture self-ignites at the MBT ignition timing) to be performed on a lower engine load side than the representative point R0, it is necessary to shift the condition of the compression end temperature Tx and the compression end pressure Px to the higher temperature/lower pressure side along with a decrease in the engine load, as indicated by the arrowed line A2a extending downwardly along the line L1. For this purpose, in FIG. 10, when the engine load is decreased from the representative point R0, the effective compression ratio $\epsilon'$ is increased while lowering the compression initial pressure P0 (fresh air amount) by the internal EGR. This makes it possible to raise the compression end temperature Tx while lowering the compression end pressure Px, with respect to the representative point R0, as indicated by the arrowed line A2a in FIG. 5, so as to continue the adequate compression self-ignition combustion toward a lower engine load side.

Fourthly, a control scheme to be executed when the engine operating state is changed from the representative point R0 to a higher engine speed side as indicated by the arrowed line A3 in FIG. 9 will be described. In this case, a control scheme for raising the compression initial temperature T0 along with an increase in the engine speed is performed, as shown in FIG. 11. Specifically, the internal EGR is performed to gradually increase the burned gas amount (amount of burned gas remaining in the cylinder) so as to gradually raise the compression initial temperature T0 in a range equal to or greater than the normal temperature.

As for the effective compression ratio $\epsilon'$ and the compression initial pressure P0, when the engine speed is in the range of 1000 to 2000 rpm, the effective compression ratio $\epsilon'$ is set to be less than 18 (15 to less than 18), and the compression initial pressure P0 is set to be greater than the atmospheric pressure, by the supercharging. Further, in the range of 2000 to 6000 rpm which is a higher engine speed side than the above engine speed range, the effective compression ratio $\epsilon'$ is maintained at 18 equal to the geometric compression ratio, and the supercharging is performed at a relatively low level to set the compression initial pressure P0 to be slightly greater than the atmospheric pressure.

As above, in a higher engine speed side than the representative point R0, the compression initial temperature T0 is raised by the internal EGR. This corresponds to changing the temperature-pressure condition rightwardly along the line M2 on the graph of FIG. 5 (see the arrowed line A3a). Thus, based on controlling the temperature/pressure in the above manner, the compression self-ignition combustion can be adequately performed in the high engine speed range.

Specifically, as a prerequisite to allowing the adequate compression self-ignition combustion (combustion mode where an air-fuel mixture self-ignites at the MBT ignition timing) to be performed in a higher engine speed side than the representative point R0, it is necessary to primarily raise the compression end temperature Tx along with an increase in the engine speed, as indicated by the arrowed line A3a extending rightwardly along the line M2. For this purpose, in FIG. 11, when the engine speed is increased from the representative point R0, the compression initial temperature T0 is raised by the internal EGR. This makes it possible to raise the compression end temperature Tx with respect to the representative point R0, as indicated by the arrowed line A3a in FIG. 5, so as to continue the adequate compression self-ignition combustion toward a higher engine speed side.

However, particularly in a higher engine speed side than 2000 rpm, the internal EGR amount is increased to raise the compression initial temperature T0 under the condition that the effective compression ratio $\epsilon'$ is fixed to 18, so that a density of fresh air becomes lower along with a rise in the temperature due to the internal EGR, which is likely to cause reduction in engine power output. For this reason, in the example illustrated in FIG. 11, in the higher engine speed side than 2000 rpm, the supercharging is performed at a relatively low level to slightly raise the compression initial pressure P0, so as to avoid lowering of the fresh air density to adequately ensure the engine power output.

The control schemes in the above examples have been described based on FIGS. 10 and 11, respectively, on the assumption that, with respect to the representative point R0, only the engine load is changed under a constant engine speed (as the arrowed line A1 and A2 in FIG. 9), and only the engine speed is changed under a constant engine load (as the arrowed line A3 in FIG. 9). However, even when the engine operating state is shifted to any zone of the engine operating region other than those in the above examples, the adequate compression self-ignition combustion can be performed throughout the entire engine operating region by deriving a condition of the compression end temperature Tx and the compression end pressure Px suitable for each engine operating zone, from the graph of FIG. 5, and controlling the effective compression ratio $\epsilon'$, the compression initial temperature T0 and/or the compression initial pressure P0 so as to establish the suitable condition.

More specifically, although FIG. 10 illustrates the control scheme to be performed when only the engine load is changed under a constant engine speed of 1000 rpm, a control pattern depending on the engine load is the same at any engine speed other than 1000 rpm. For example, in cases where the engine speed is set to a constant value, such as 2000 rpm, 3000 rpm, 4000 rpm, 5000 rpm or 6000 rpm, a control scheme may be employed which is configured to, on a higher engine load side than a given engine load, reduce the effective compression ratio $\epsilon'$ while increasing the fresh air amount (i.e., raising the compression initial pressure P0) by the supercharging, and, on a lower engine load side than the given engine load, increasing the effective compression ratio $\epsilon'$ while reducing the fresh air amount (i.e., lowering the compression initial pressure P0) by the internal EGR, as with the control scheme illustrated in FIG. 10.

Further, although FIG. 11 illustrates the control scheme to be performed when only the engine speed is changed under a constant engine load (IMEP) of 500 kPa, a control pattern depending on the engine speed is the same at any engine load (IMEP) other than 500 kPa. Specifically, at any engine load (IMEP) other than 500 kPa, the compression initial temperature T0 may be raised by the internal EGR while performing the supercharging according to need, along with an increase in the engine speed, as with the control scheme illustrated in FIG. 11.

However, in the above cases, specific control target values of the effective compression ratio ε', the compression initial temperature T0, etc., have to be set differently from those in the control schemes illustrated in FIGS. 10 and 11. For example, in FIG. 9, the zone U representing a high engine speed/low engine load range corresponds to a lower right portion of the region S as cross-referred with FIG. 5. In this engine operating zone, it is necessary to maximally raise the compression end temperature Tx. Thus, the effective compression ratio ε' is set to the maximum value of 18 while maximally increasing the internal EGR amount to further raise the compression initial temperature T0. Specifically, as shown in FIGS. 10 and 11, at the operating point R2 (engine speed=1000 rpm and no engine load (IMEP=200 kPa)) and the operating point R3 (engine speed=6000 rpm and ⅓ engine load (IMEP=500 kPa)), the internal EGR is performed to raise the compression initial temperature T0 so as to raise the compression end temperature Tx. Differently, in the high engine speed/low engine load range (zone U in FIG. 9), the internal EGR is performed to obtain a larger internal EGR amount than those for the operating points R2, R2, so as to further raise the compression end temperature Tx. This makes it possible to perform the adequate the compression self-ignition combustion in the high engine speed/low engine load range.

In FIG. 9, the zone V representing a high engine speed/high engine load range corresponds to an upper right portion of the region S as cross-referred with FIG. 5. In this engine operating zone, it is necessary to set the compression end temperature Tx to a higher value, for example, as compared with the low engine speed/high engine load operating point R1 (engine speed=1000 rpm and IMEP=1300 kPa). For this purpose, in the high engine speed/high engine load range, the effective compression ratio ε' may be set to a larger value than that for the operating point R1. Specifically, at the operating point R1, in order to create the condition that the compression end temperature Tx is relatively low and the compression end pressure Px is relatively high, the effective compression ratio ε' is reduced down to 10.5 while raising the compression initial pressure P0 by the supercharging. Differently, in the high engine speed/high engine load range (zone V in FIG. 9), considering the need for more largely raising the compression end temperature Tx as compared with the operating point R1, the effective compression ratio ε' may be set to be greater than 10.5 so as to provide a higher in-cylinder temperature.

(2-4) Functions, Effects, etc.

As described above, in the engine according to the above embodiment, wherein the excess air ratio λ, i.e., a ratio of an actual air-fuel ratio to the stoichiometric air-fuel ratio, is set to 2.4 throughout the entire engine operating region, as a control scheme to be performed when the engine operating state is changed along the engine speed-axis direction, for example, as shown in FIG. 11, in a higher engine speed side, the compression initial temperature T0 is raised by increasing the internal EGR amount (amount of burned gas remaining in the cylinder) with respect to the lower engine speed side. This control scheme has an advantage of being able to allow the compression self-ignition combustion under a lean air-fuel ratio to be performed in a wider engine speed range so as to more effectively enhance the engine thermal efficiency.

Specifically, in the above embodiment, when the engine operating state is changed in the engine speed-axis direction, the internal EGR amount is increased as the engine speed becomes higher, to increase the compression initial temperature T0, so that primarily the compression end temperature Tx can be raised, as indicated by the arrowed line A3a in FIG. 5, so as to increase a collision velocity between fuel and oxygen molecules to facilitate a chemical reaction therebetween. This makes it possible to reliably cause an air-fuel mixture to self-ignite even in the high engine speed range where a period having high in-cylinder temperatures/pressures (high-temperature/high-pressure period) becomes shorter, so that an engine speed range capable of performing the compression self-ignition combustion under a lean air-fuel ratio can be expanded to a higher side to further effectively enhance the engine thermal efficiency.

Particularly, in the above embodiment, in conjunction with raising the compression initial temperature T0 by the internal EGR as shown in FIG. 11, the compression initial pressure P0 is raised by the supercharging. This provides an advantage of being able to compensate for lowering of fresh air density due to the temperature rise, based on supercharged fresh air, so as to adequately ensure the engine power output, irrespective of engine speed values.

In the above embodiment, the geometric compression ratio is set to 18. Further, on a higher engine load side than a given engine load (e.g., IMEP=500 kPa at an engine speed of 1000 rpm), the fresh air amount is increased by increasing the supercharging pressure based on the supercharger 25, while reducing the effective compression ratio ε', as compared with a lower engine load side than the given engine load, and on the lower engine load side than the given engine load, the fresh air amount is reduced by the internal EGR while increasing the effective compression ratio ε', as compared with the higher engine load side than the given engine load. This control scheme has an advantage of being able to allow the compression self-ignition combustion under a lean air-fuel ratio to be performed in a wider engine load range so as to more effectively enhance the engine thermal efficiency.

Specifically, in the above embodiment, the compression end temperature Tx can be lowered while raising the compression end pressure Px, as indicated by the arrowed line A1a in FIG. 5, by increasing the fresh air amount based on the supercharging and reducing the effective compression ratio ε', according to an increase in the engine load, so that it becomes possible to sufficiently ensure the engine power output based on a large amount of supercharged fresh air, while reducing the collision velocity between fuel and oxygen molecules to suppress the chemical reaction therebetween so as to effectively prevent abnormal combustion, such as knocking or preignition.

Further, when the engine load is decreased, the compression end temperature Tx can be raised while lowering the compression end pressure Px, as indicated by the arrowed line A2a in FIG. 5, by reducing the fresh air amount based on the internal EGR and increasing the effective compression ratio ε', so that it becomes possible to increase a molecular velocity to facilitate the chemical reaction so as to reliably cause an air-fuel mixture to self-ignite, even in a situation where the fresh air amount is small and thereby a frequency of the collision between fuel and the oxygen molecules is low.

Based on the above advantageous effects, in the above embodiment, the compression self-ignition combustion under a lean air-fuel ratio can be adequately performed in a wider range along the engine load-axis direction to effectively enhance the engine thermal efficiency.

Particularly in the above embodiment, the internal EGR for causing high-temperature burned gas to remain in the combustion chamber 6 is performed to reduce the fresh air amount on the lower engine load side than the given engine load, so that it becomes possible to not only reduce the fresh air amount but also raise the compression initial temperature T0, by internal EGR. This provides an advantage of being able to effectively create a condition of the compression end temperature Tx and the compression end pressure Px suitable for a low engine load so as to allow the compression self-ignition combustion under a lean air-fuel ratio to be adequately performed on the lower engine load side.

As above, in the engine according to the above embodiment, respective parameters of the effective compression ratio $\epsilon'$, the compression initial temperature T0 and the compression initial pressure P0 can be adequately controlled by taking advantage of supercharging, internal EGR, etc., to create the condition of the compression end temperature Tx and the compression end pressure Px as shown in FIG. 5 so as to allow the adequate compression self-ignition combustion (combustion mode where an air-fuel mixture self-ignites at the MBT ignition timing) to be performed throughout the entire engine operating region.

In a verification test using actual engines, the inventors have verified that it is able to cause an air-fuel mixture to self-ignite around the MBT ignition timing throughout the entire engine operating region by controlling an engine under the conditions based on the above embodiment. Further, in experimental tests, a combustion period of the compression self-ignition combustion has also be checked, and it has been verified that a so-called "10-to-90% mass burning period (a period after 10% of a mass of fuel is burned through until 90% of the mass is burned) falls within a combustion period of about 10 degrees CA. This combustion mode where the 10-to-90% mass burning period falls within 10 degrees CA is shorter in combustion period as compared with the conventional spark-ignition combustion mode, and thereby it is expected to provide higher engine thermal efficiency.

(2-5) Other Embodiments

In the above embodiment, in order to reliably cause an air-fuel mixture to self-ignite even in a situation where the engine speed is increased up to the high engine speed range (i.e., the high-temperature/high-pressure period is short), the compression end temperature Tx just before ignition is raised by increasing a burned-gas remaining amount based on the internal EGR (internal EGR amount) to raise the compression initial temperature T0 in the cylinder, for example, as shown in FIG. 11. However, the technique for rising the compression end temperature Tx is not limited to the type based on the internal EGR. For example, it is contemplated to raise the compression initial temperature T0 and the compression end temperature Tx by forcedly heating fresh air in the intake passage and introducing the heated air into the cylinder.

Alternatively, the compression end temperature Tx may be raised by activating the spark plug in a compression stroke to secondarily ignite a part of an air-fuel mixture. Based on raising the compression end temperature Tx by means of the secondary ignition in this manner, the remaining air-fuel mixture is allowed to self-ignite around the compression TDC (MBT). In this case, only the compression end temperature Tx is raised without raising the compression initial temperature T0.

The control scheme in the above embodiment is configured to, when the engine load is increased to some extent (e.g., in the range equal to or greater than IMEP=500 kPa as shown in FIG. 10), lower the compression end temperature Tx while raising the compression end pressure Px, as indicated by the arrowed line A1a in FIG. 5, by increasing the supercharging pressure based on the supercharger 25 while gradually reducing the effective compression ratio $\epsilon'$. In this control scheme, particularly, when the engine load is increased to a vicinity of the full engine load (IMEP=1300 kPa), it becomes necessary to introduce a large amount of fresh air into the cylinder by the supercharging while largely reducing the effective compression ratio $\epsilon'$ with respect to the geometric compression ratio (e.g., reducing from 18 to 10.5 in the full engine load). If the supercharger 25 has a sufficient capacity, such control can be performed without any problem. However, in case where the capacity of the supercharger 25 cannot be sufficiently ensured due to restrictions of cost, etc., it is assumed that it becomes difficult to achieve such control in the high engine load range. Thus, in a high load range, the combustion mode may be switched to the spark-ignition (SI) combustion mode where an air-fuel mixture is forcedly ignited by a spark discharge from the spark plug 16, wherein the compression self-ignition combustion is performed only in a partial engine load range.

In the above embodiment, the excess air ratio $\lambda$, i.e., a ratio of an actual air-fuel ratio to the stoichiometric air-fuel ratio, is set to 2.4 throughout the entire engine operating region without exception to sufficiently reduce an amount of NOx to be produced from combustion (raw NOx amount) itself so as to sufficiently meet emission regulations even if a NOx catalyst is omitted. However, in cases where a NOx catalyst can be provided in the engine, the excess air ratio $\lambda$ may be set to be less than 2.4 at lest in a part of the engine operating region. However, in view of sufficiently meeting strict emission regulations anticipated in the future, even if a NOx catalyst is provided, the excess air ratio $\lambda$ should be set to 2 or more. As described based on FIG. 1, as long as the excess air ratio $\lambda \geq 2$, NOx emissions can be reduced to a sufficient level by purifying the produced NOx through the NOx catalyst.

In the above embodiment, the geometric compression ratio of the engine is set to 18. Alternatively, it may be set to any suitable value other than 18. For example, in the graph of FIG. 5, in view of the fast that the zone W representing a temperature-pressure range to be obtained when fresh air having the normal temperature and the atmospheric pressure is compressed at a compression ratio of 16 to 18, overlaps the region S representing the temperature-pressure condition required for the adequate compression self-ignition combustion, it is believed that, as long as the geometric compression ratio is set to at least 16 or more, the adequate compression self-ignition combustion can be performed in each engine operating zone as with the above embodiment, by appropriately changing the effective compression ratio $\epsilon'$ under a condition that the compression ratio 16 is defined as a maximum value of a control range. For this reason, the geometric compression ratio may be set to at least 16 or more.

In the above embodiment, in order to raise the compression end temperature Tx to cause an air-fuel mixture to self-ignite, when the engine load is low or the engine speed is high, the negative overlap period NVO (FIG. 7) where both of the intake and exhaust valves are closed during a transition from an exhaust stroke to a subsequent intake stroke, and the internal EGR for causing high-temperature burned gas to remain in the combustion chamber 6 is performed by means of the negative overlap period NVO. However, a technique for performing the internal EGR is not limited to the type utilizing the negative overlap period NVO. For example, in an engine having two exhaust valves 12 per cylinder, a technique may be employed which is designed to open one of the exhaust valves during an intake stroke to allow burned gas to return from an exhaust passage to a combustion chamber 6 on the intake stroke so as to cause the burned gas to remain in the combustion chamber 6.

At the end of description, features and advantages of the present inventions disclosed based on the above embodiments will be summarized.

As one aspect of the present invention to achieve the aforementioned object, there is provided a method for controlling an engine. The method comprises a step of allowing a compression self-ignition combustion under an air-fuel ratio leaner than a stoichiometric air-fuel ratio to be performed at least in a partial-load range of the engine, wherein, under a condition that an engine speed varies at a same load in an engine operating region of the compression self-ignition combustion, a compression end temperature, which is an in-cylinder temperature just before an air-fuel mixture self-ignites, is controlled to be raised higher in a higher engine speed side than in a lower engine speed side.

As another aspect of the present invention, there is provided an apparatus for controlling an engine. The apparatus comprises a controller adapted to control respective sections of the engine to allow a compression self-ignition combustion under an air-fuel ratio leaner than a stoichiometric air-fuel ratio to be performed at least in a partial-load range of the engine, wherein the controller is operable, under a condition that an engine speed varies at a same load in an engine operating region of the compression self-ignition combustion, to control a compression end temperature, which is an in-cylinder temperature just before an air-fuel mixture self-ignites, in such a manner that it is raised higher in a higher engine speed side than in a lower engine speed side.

In the method and apparatus of the present invention, in order to allow the compression self-ignition combustion under an air-fuel ratio leaner than the stoichiometric air-fuel ratio to be performed, the compression end temperature is raised higher in the higher engine speed side than in the lower engine speed side, so that it becomes possible to increase a collision velocity between fuel and oxygen molecules as the engine speed becomes higher and thereby the high-temperature/high-pressure period in the cylinder becomes shorter, to facilitate a chemical reaction therebetween so as to reliably cause an air-fuel mixture to self-ignition. This makes it possible to expand an engine speed range capable of performing the compression self-ignition combustion under a lean air-fuel ratio, to a higher engine speed side to further effectively enhance engine thermal efficiency.

Preferably, in the method of the present invention, the control for raising compression end temperature includes a control for raising a compression initial temperature which is an in-cylinder temperature at a start timing of a compression stroke, wherein, the compression initial temperature is controlled to be raised higher in the higher engine speed side than in the lower engine speed side.

Preferably, in the apparatus of the present invention, the control for raising the compression end temperature includes a control for raising a compression initial temperature which is an in-cylinder temperature at a start timing of a compression stroke, wherein the controller is operable to control the compression initial temperature in such a manner that it is raised higher in the higher engine speed side than in the lower engine speed side.

In the above method and apparatus, the compression end temperature is raised by raising the compression initial temperature, so as to allow the compression self-ignition combustion to be adequately performed in the high engine speed side.

Preferably, in the above method, the control for raising the compression initial temperature includes a control for performing internal EGR for causing burned gas to remain in a cylinder, wherein, an internal EGR amount is controlled to be increased larger in the higher engine speed side than in the lower engine speed side.

Preferably, in the above apparatus, the control for raising the compression initial temperature includes a control for performing internal EGR for causing burned gas to remain in a cylinder, wherein the controller is operable to control an internal EGR amount in such a manner that it is increased larger in the higher engine speed side than in the lower engine speed side.

In the above method and apparatus, the compression initial temperature can be adequately raised to a high value by allowing high-temperature burned gas to remain in the cylinder.

Preferably, in the above method, when the internal EGR is performed at a same engine speed, the internal EGR amount is increased as the load becomes lower.

Preferably, in the above apparatus, the controller is operable, when the internal EGR is performed at a same engine speed, to increase the internal EGR amount as the load becomes lower.

In the above method and apparatus, even in a situation where the engine load is low (i.e., the fresh air amount is small) and thereby a frequency of the collision between fuel and the oxygen molecules is low, a molecular velocity can be increased to promote a chemical reaction therebetween so as to reliably cause an air-fuel mixture to self-ignite.

Preferably, the above method comprises a step of raising a compression initial pressure which is an in-cylinder pressure at a start timing of a compression stroke, according to a rise in the compression initial temperature, by means of supercharging.

Preferably, in the above apparatus, the engine is equipped with a supercharger operable to supercharge fresh air, wherein the controller is operable to activate the supercharger to raise a compression initial pressure which is an in-cylinder pressure at a start timing of a compression stroke, according to a rise in the compression initial temperature.

In the above method and apparatus, an engine power output can be adequately ensured irrespective of engine speed values by compensating for lowering of fresh air density due to the rise in the compression initial temperature, based on the supercharging.

Preferably, in the method and apparatus of the present invention, a geometric compression ratio of the engine is 16 or more.

In the above method and apparatus, a geometric compression ratio of the engine is set to 16 or more, so that an air-fuel mixture can be sufficiently increased in temperature/pressure so as to reliably cause the air-fuel mixture to self-ignite. In addition, such a high compression ratio is also advantageous in terms of the engine thermal efficiency.

Preferably, in the method of the present invention, throughout the engine operating region subject to the compression self-ignition combustion, an excess air ratio λ which is a ratio of an actual air-fuel ratio to the stoichiometric air-fuel ratio, is set to 2 or more.

Preferably, in the apparatus of the present invention, the controller is operable, throughout the engine operating region subject to the compression self-ignition combustion, to set an excess air ratio λ which is a ratio of an actual air-fuel ratio to the stoichiometric air-fuel ratio, to 2 or more.

In the above method and apparatus, the compression self-ignition combustion is performed under a significantly lean air-fuel ratio corresponding to an excess air ratio λ of 2 or more. This has an advantage of being able to effectively reduce an amount of NOx to be produced from combustion so as to sufficiently meet emission regulations.

This application is based on Japanese Patent Application Serial No. 201-014907, filed in Japan Patent Office on Jan. 27, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for controlling an engine, comprising steps of:
allowing a compression self-ignition combustion under an air-fuel ratio leaner than a stoichiometric air-fuel ratio to be performed at least in a partial-load range of the engine, and
acquiring a compression end temperature which is an in-cylinder temperature just before an air-fuel mixture self-ignites,
wherein, under a condition that an engine speed varies at a same load in an engine operating region of the compression self-ignition combustion, the compression end temperature is controlled to be raised higher in a higher engine speed side than in a lower engine speed side.

2. The method as defined in claim 1, wherein the control for raising the compression end temperature includes a control for raising a compression initial temperature which is an in-cylinder temperature at a start timing of a compression stroke, and wherein, the compression initial temperature is controlled to be raised higher in the higher engine speed side than in the lower engine speed side.

3. The method as defined in claim 2, wherein the control for raising the compression initial temperature includes a control for performing internal EGR for causing burned gas to remain in a cylinder, and wherein, an internal EGR amount is controlled to be increased larger in the higher engine speed side than in the lower engine speed side.

4. The method as defined in claim 3, wherein, when the internal EGR is performed at a same engine speed, the internal EGR amount is increased as the load becomes lower.

5. The method as defined in claim 2, further comprising a step of raising a compression initial pressure which is an in-cylinder pressure at a start timing of a compression stroke, according to a rise in the compression initial temperature, by means of supercharging.

6. The method as defined in claim 1, further comprising a step of setting a geometric compression ratio of the engine to 16 or more.

7. The method as defined in claim 1, wherein, throughout the engine operating region subject to the compression self-ignition combustion, an excess air ratio λ which is a ratio of an actual air-fuel ratio to the stoichiometric air-fuel ratio, is set to 2 or more.

8. An apparatus for controlling an engine, comprising:
a controller adapted to control respective sections of the engine to allow a compression self-ignition combustion under an air-fuel ratio leaner than a stoichiometric air-fuel ratio to be performed at least in a partial-load range of the engine,
wherein the controller is operable, under a condition that an engine speed varies at a same load in an engine operating region of the compression self-ignition combustion, to control a compression end temperature, which is an in-cylinder temperature just before an air-fuel mixture self-ignites, in such a manner that it is raised higher in a higher engine speed side than in a lower engine speed side.

9. The apparatus as defined in claim 8, wherein the control for raising the compression end temperature includes a control for raising a compression initial temperature which is an in-cylinder temperature at a start timing of a compression stroke, and wherein the controller is operable to control the compression initial temperature in such a manner that it is raised higher in the higher engine speed side than in the lower engine speed side.

10. The apparatus as defined in claim 9, wherein the control for raising the compression initial temperature includes a control for performing internal EGR for causing burned gas to remain in a cylinder, and wherein the controller is operable to control an internal EGR amount in such a manner that it is increased larger in the higher engine speed side than in the lower engine speed side.

11. The apparatus as defined in claim 10, wherein the controller is operable, when the internal EGR is performed at a same engine speed, to increase the internal EGR amount as the load becomes lower.

12. The apparatus as defined in claim 9, wherein the engine is equipped with a supercharger operable to supercharge fresh air, and wherein the controller is operable to activate the supercharger to raise a compression initial pressure which is an in-cylinder pressure at a start timing of a compression stroke, according to a rise in the compression initial temperature.

13. The apparatus as defined in claim 8, wherein a geometric compression ratio of the engine is set to 16 or more.

14. The apparatus as defined in claim 8, wherein the controller is operable, throughout the engine operating region subject to the compression self-ignition combustion, to set an excess air ratio λ which is a ratio of an actual air-fuel ratio to the stoichiometric air-fuel ratio, to 2 or more.

\* \* \* \* \*